July 2, 1935.　　　A. N. CALKINS　　　2,006,730

TRACTION VARYING MEANS FOR TRACTOR WHEELS

Filed Jan. 22, 1934　　　2 Sheets-Sheet 1

INVENTOR
Addison N. Calkins

July 2, 1935.  A. N. CALKINS  2,006,730
TRACTION VARYING MEANS FOR TRACTOR WHEELS
Filed Jan. 22, 1934  2 Sheets-Sheet 2

INVENTOR
Addison N. Calkins

Patented July 2, 1935

2,006,730

UNITED STATES PATENT OFFICE 2,006,730

TRACTION VARYING MEANS FOR TRACTOR WHEELS

Addison N. Calkins, Quincy, Ill., assignor to Electric Wheel Company, Quincy, Ill.

Application January 22, 1934, Serial No. 707,639

4 Claims. (Cl. 301—41)

My invention relates to traction wheels for tractors, motor and similar vehicles and more particularly to means for varying the tractive effort of the driving wheels of such vehicles according to the demands met in their operation over different road and surface conditions.

The present invention applies particularly to a provision for varying the traction effort by means of weights applied to the wheels when additional traction is needed and removed when less traction weight is needed to haul the required load thus adjusting the traction to the load with a saving in the fuel required.

The invention also provides for weights on each side of the spokes to avoid an excessive over-hang on one side of the wheel. These weights are in annular form to take up as little space as possible. One primary weight is provided with an annular rim to support additional weights when same are required. The secondary weights are fastened independently to the primary weight by bolts passing through one primary weight.

It is to be understood that the invention is not limited to the exact form shown on the drawings except insofar as such limitations are specified in the appended claims. An embodiment of the invention is illustrated in the accompanying drawings in which Figure 1 is a vertical transverse section of the wheel equipped with the weights attached to the rim of the wheel.

The wheel illustrated in the accompanying drawings comprises a hub 1 and a rim 3 which are connected to each other in the usual manner by the spokes 2. Any desired construction can be used in the wheel. The construction is shown with a pneumatic tire 9 but a cushion rubber tire may be used or the wheel may be in the form of an all metal traction wheel.

As previously stated the present invention is directed to a traction varying means by the use of demountable weights which can be put on or taken off the wheel when more or less traction is desired thereby effecting a saving in fuel when lighter loads are being handled instead of carrying heavier weights than necessary when only light loads are being handled.

The present invention also makes it possible to utilize the space between the hub and rim on both sides of the spokes thus balancing the traction varying weights on both sides of the spokes instead of overhanging all of them on one side of the spokes.

Preferred types of the invention are illustrated in Figures 1, 2, 3, 4 and 5.

Figure 1:
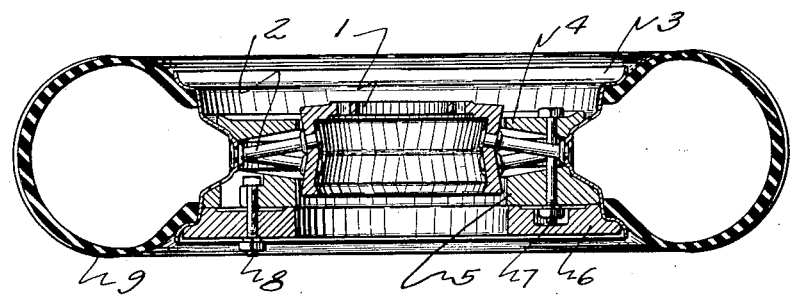

Figure 1 shows the weights 4 and 5 on opposite sides of the rim with the wheel spokes therebetween. It is to be noted that the weights are supported on the rim and clamped to the rim by the bolts 7. The weight 6 is attached to the weight 5 by bolts 8. The weight 6 is also supported by the rim 3.

Figure 3:
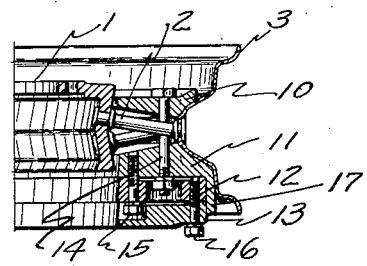
Figure 3 is a vertical transverse section of a portion of the wheel equipped with primary and secondary weights.
Figure 2:
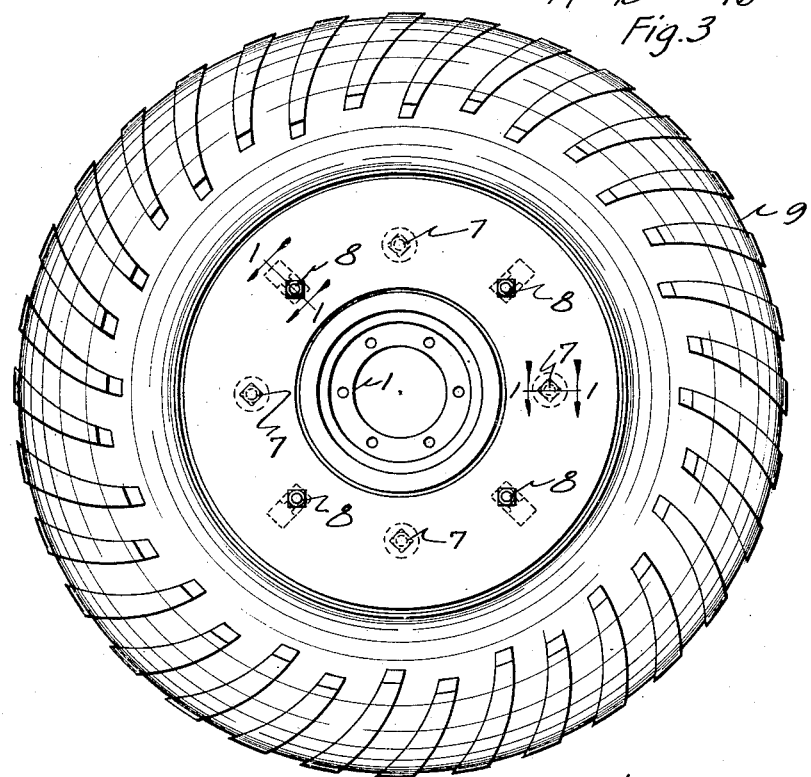
Figure 2 is a face view of the wheel fully equipped with weights attached to the rim of the wheel.

Figure 3 illustrates a section of a portion of the rim and hub with the two primary weights 10 and 11 attached to the rim 3 by the bolts 14 with the wheel spokes therebetween. The secondary weights 12 and 13 are shown in the rim 17 on the primary weight 11. These secondary weights are attached to the primary weight 11 by the cap screws 15 and 16. As a matter of convenience it is to be noted that the cap screws holding each secondary weight in place can be taken completely out and the weight then removed. The primary weights are held in place with the same number of bolts which may also be removed before the weights are taken out.

Figure 4:
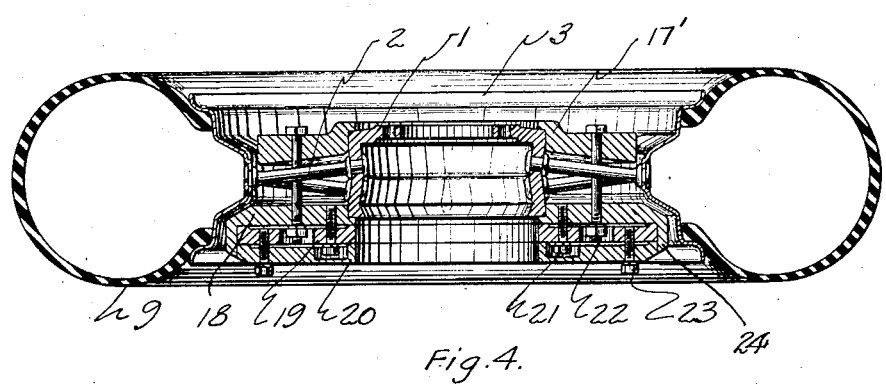
Figure 4 is a vertical transverse section of the wheel with the weights attached to the hub of the wheel.
Figure 5:
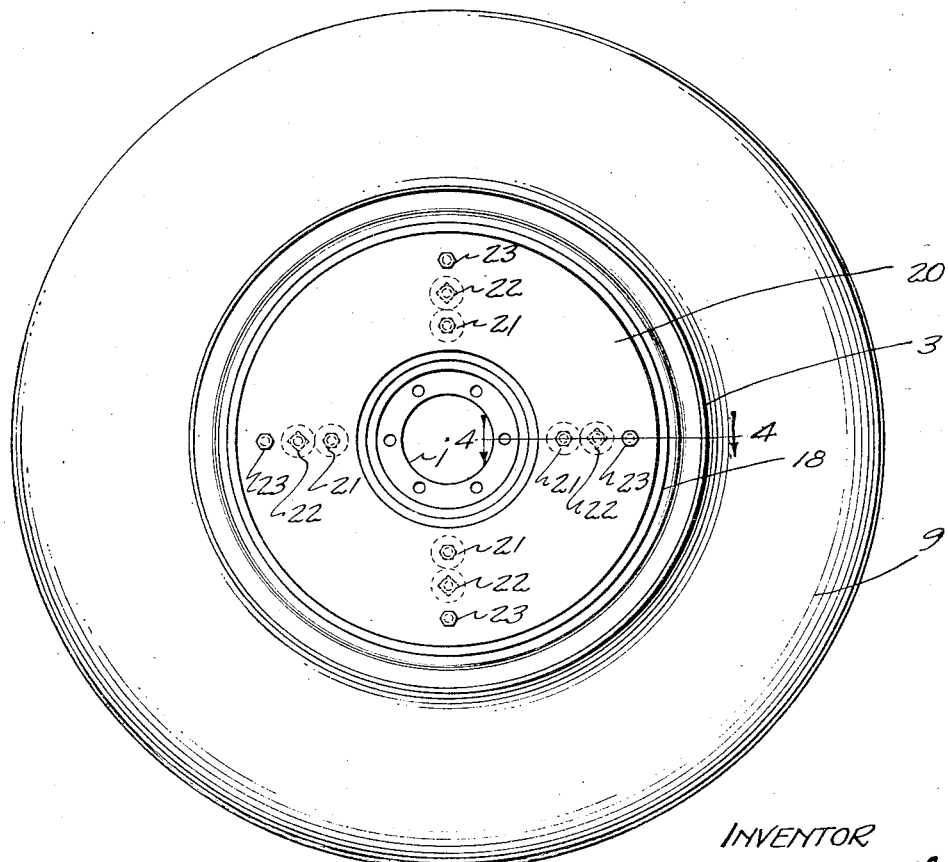
Figure 5 is a face view of the wheel with the weights attached to the hub of the wheel.

Figures 4 and 5 illustrate the arrangement of the traction varying weights when same are attached to the hub of the wheel instead of the rim of the wheel and when so located they are more suited to large diameter wheels than are weights mounted on the rim of the large diameter wheels. On relatively small wheels, that is 30 inch diameter and less, the weights attached to the rim work out better due to the necessity of using all the space between the wheel hub and rim to get the required number of weights in place.

Figure 4 shows the primary traction varying weights 17' and 18 on each side of the hub 1 and attached thereto by the bolts 22. The secondary weight 19 is attached to primary weight 18 by the cap screws 21. The secondary weight 20 is attached to the secondary weight 19 by the cap screws 23. It is to be noted that both secondary weights 19 and 20 are located in the rim 24 on the primary weight 18.

The illustrations are shown by way of examples of preferred forms as applied to a particular type of wheel. It is, of course, obvious that modifications may suggest themselves to those skilled in the art; therefore the invention is not limited to any specific construction except insofar as such limitations are specified in the appended claims.

Having thus described my invention what I claim is as follows:

1. In a traction wheel, the combination of a rim and hub with spokes connecting the two, a plurality of weights, the first two of said weights supported on the rim and clamped to the opposite sides of said rim, one of said weights having an extended rim supporting additional weights.

2. A traction wheel comprising a hub, a rim, spokes connecting the rim to the hub, primary weights on each side of the spokes supported by the rim, a rim on one primary weight, means for holding said weights in position, additional weights in said rim on one primary weight and means for attaching said additional weights to the primary weight.

3. A traction wheel comprising a hub, a rim, spokes connecting the rim to the hub, two primary weights, one on each side of the hub with the spokes therebetween, means for holding said weights in position while supported by the hub, said means passing between the spokes without being attached to same and additional weights attached to one primary weight.

4. A traction wheel comprising a hub, a rim, spokes connecting the rim to the hub, primary weights on each side of the spokes supported by the wheel, a rim on one primary weight, means for holding said weights in position, additional weights in said rim on one primary weight and means for attaching said additional weight to the primary weight.

ADDISON N. CALKINS.